Dec. 25, 1956 W. A. BEDFORD, JR 2,775,010
PANEL FASTENING DEVICE
Filed Aug. 23, 1954

INVENTOR:
WILLIAM A. BEDFORD JR.,
BY Robert E Ross
ATTORNEY.

United States Patent Office 2,775,010
Patented Dec. 25, 1956

2,775,010

PANEL FASTENING DEVICE

William A. Bedford, Jr., North Scituate, Mass., assignor, by mesne assignments, to United-Carr Fastener Corporation, Boston, Mass., a corporation of Delaware Application August 23, 1954, Serial No. 451,429

3 Claims. (Cl. 24—73)

This invention relates generally to fastening devices, and has particular reference to a fastening device for securing a panel to a support.

In the manufacture of automobiles, a fiber panel covered with cloth or plastic is used for covering the inside of the door. Such panels have, in the past, been attached by several methods. One method is to provide a round hole in the supporting panel on the door, and secure the panel thereto by means of a fastener having a hook-like portion for receiving the panel and a protruding snap fastener stud for snapping into the round hole. Another method is to provide a punched slot in the support panel on the door, and secure the panel thereto by means of a ratchet nail having a head disposed in a suitable keyhole slot in the panel, with the ratchet nail being driven into the slot. This latter method has the disadvantage that it is difficult to remove the panel for repair of the door or to replace the panel. Consequently, it has been desirable to provide a fastener which will hook onto the panel and having a stud portion which will snap or drive into the punched slot for use as a repair fastener and also for use as an original equipment fastener where it is desired to continue the use of the punched slot rather than converting to round holes, for reasons of economy. The principal difficulty in the design of such a fastener is the fact that in the forming of the punched slots, sometimes the metal is not completely separated. Hence, the stud portion of such a fastener must be strong enough to force the edges of the metal apart, and yet must have a snap action which is not damaged by driving into such slots.

The object of the invention is to provide a panel fastener which meets the above requirements, in that it has a stud portion having sufficient strength to drive into a punched slot which is not completely open, and has a portion thereon for snap fastener engagement in the slot which is not damaged by being driven into the slot.

Other objects of the invention will, in part, be obvious, and will, in part, appear hereinafter.

Figure 1:
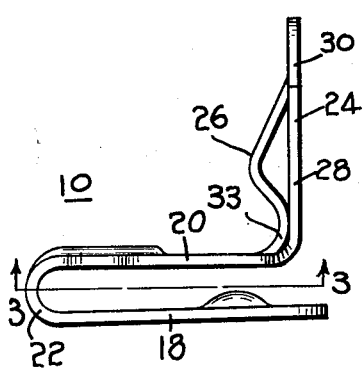
Fig. 1 is a view in side elevation of a fastening device embodying the features of the invention.
Figure 2:
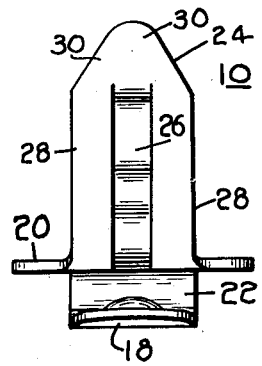
Fig. 2 is a view of the fastener of Fig. 1 as seen from the right side.
Figure 3:
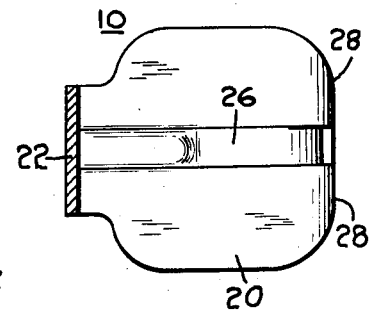
Fig. 3 is a view in section taken on line 3—3 of Fig. 1.

Referring to the drawing, there is illustrated a fastening device 10, which is particularly adapted for use in securing a panel 12 to a support 14 having punched slots 16 formed therein.

The fastener 10 is preferably formed of relatively strong sheet metal such as carbon steel, and in the illustrated embodiment is formed of a single strip of material bent to provide a panel engaging portion formed by a pair of arms 18 and 20 joined at one end by a bight portion 22, and a stud portion 24 extending from the arm 20. The stud portion 24 has a longitudinal medial portion 26 sheared from the adjacent portion, forming a pair of side portions 28 which are substantially flat and co-planar. The medial portion 26 and the side portions 28 are integral and co-planar at their junction at the outer end of the stud forming a flat nose portion 30. The side portions 28 are joined to the arm 20 at the end thereof, and the medial portion 26 is joined to said arm 20 in spaced relation to the end, and is bowed outwardly away from the plane of the side portions 28 between the junction with the arm 20 and the nose 30, forming a shoulder 32 disposed in spaced relation to the arm 20.

The portion 33 of the medial portion 26 is displaced from the plane of the side portions 28 for a purpose to appear hereinafter.

The fastener 10 is assembled onto the panel 12 in the usual manner, by hooking the arm 18 through a suitably positioned slot in the panel, and driving the stud 24 into the punched slot 16 in the support. In cases where the slot 16 is not completely open, the stud must be driven by the use of a hammer, so that the stud deforms the edges of the metal in entering the slot. The illustrated fastener has sufficient strength to permit it to be driven into the slot by reason of the construcion of the stud, with the center portions and the medial portion being integral at the nose to provide an entering wedge, and by reason of being joined to the arm 20 in spaced relation, to strengthen the stud at the point of greatest bending stress. Since the medial portion having the snap shoulder formed thereon has no free end, but is integral with the rest of the fastener at both ends, it is not damaged by being driven through a partially closed slot.

Figure 4:
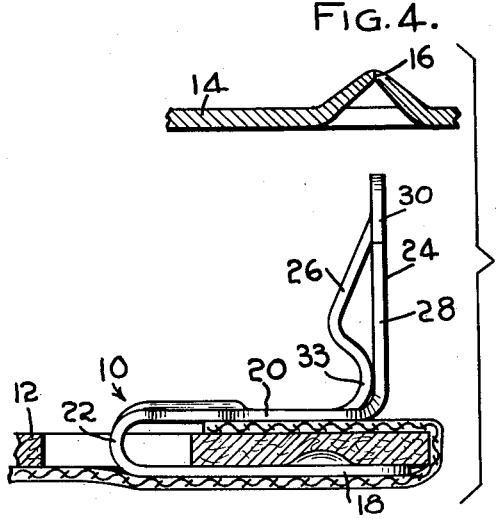
Fig. 4 is a view in elevation partly in section of the fastener of Fig. 1 assembled onto a trim panel and in position for assembly into an aperture in a support panel.
Figure 6:
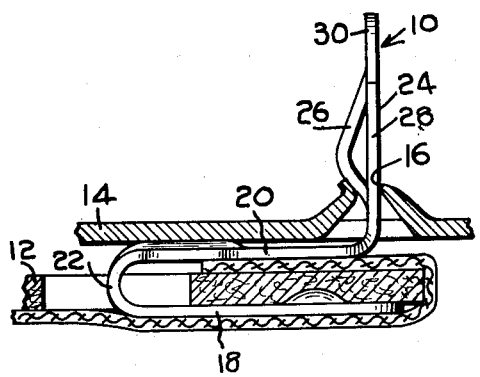
Fig. 6 is a view in elevation partly in section of the fastener and trim panel secured to the support panel.
Figure 5:
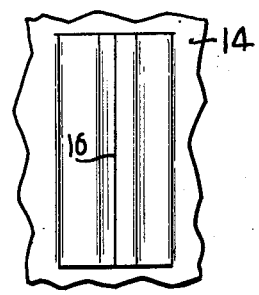
Fig. 5 is a top plan view of the portion of the panel shown in Fig. 4.

When the stud is driven through the slot 16, the medial portion 26 must flex toward the plane of the side portions 28. For this purpose the construction of the fastener enables the portion 33 of the medial portion to enter the space between the stud portions at the lower end thereof, and hence, the flexing of the medial portion can occur without tending to tilt the rest of the stud to the right as seen in Fig. 4.

The assembly of the stud opens the slot 16, so that thereafter the stud may be snapped into and out of the slot in the usual manner.

Since certain obvious modifications may be made in the device without departing from the scope of the invention, it is intended that all matter contained herein be interpreted in an illustrative and not in a limiting sense.

I claim:

1. A panel fastener for securing a panel to a sheet metal support having a slot formed therein, said fastener comprising a base having a panel engaging means associated therewith and a stud extending from one end of the base substantially perpendicular thereto, said stud comprising a flat portion having a longitudinal slot disposed therein and extending into the adjacent portion of the base, and a flexible snap fastener member joined to the flat portion at the end of the slot and to the base at the other end of the slot, said snap fastener member having an upper portion bowed outwardly to provide a snap shoulder and a lower portion curving gradually into the plane of the base.

2. A panel fastener for securing a panel to a sheet metal support having a slot formed therein, said fastener comprising a base having a panel engaging means associated therewith and a stud extending from the base substantially perpendicular thereto, said stud comprising a flat portion having a tapered end for driving into said slot, said flat portion having a longitudinal slot disposed therein and extending into said base, and a flexible snap fastener member having one end joined to the stud at the outermost end of the slot and the other end joined to the base at the other end of the slot, said member being inclined from the outermost end of the slot out of the plane of the flat portion and then inwardly toward said plane to form a shoulder portion and then curving gradually into the plane of the base.

3. A panel fastener for securing a panel to a sheet metal support having a slot punched therein, said fastener being a single strip of material comprising a base portion bent upon itself forming upper and lower base portions spaced from one another, a stud portion connected to the free end of said upper base portion substantially at right angles thereto, said stud having a flat portion with a longitudinal slot disposed therein and extending into the adjacent portion of the top base portion, and a flexible snap fastener member joined to the flat portion at the end of the slot and to the base at the other end of the slot, said snap fastener member having an upper portion bowed outwardly to provide a snap shoulder and a lower portion curving gradually into the plane of the upper base portion.

References Cited in the file of this patent

UNITED STATES PATENTS

| | | |
|---|---|---|
| 2,096,319 | Churchill | Oct. 19, 1937 |
| 2,152,603 | Pender | Mar. 28, 1939 |
| 2,171,925 | Fitts | Sept. 5, 1939 |
| 2,305,122 | Wiley | Dec. 15, 1942 |
| 2,537,786 | Poupitch | Jan. 9, 1951 |
| 2,698,472 | Knohl | Jan. 4, 1955 |